(12) United States Patent
Oshima et al.

(10) Patent No.: US 6,718,880 B2
(45) Date of Patent: Apr. 13, 2004

(54) METHOD FOR IMAGE FORMATION AND INTERMEDIATE TRANSFER RECORDING MEDIUM

(75) Inventors: Katsuyuki Oshima, Shinjuku-ku (JP); Kozo Odamura, Shinjuku-ku (JP); Takayuki Imai, Shinjuku-ku (JP); Tadahiro Ishida, Shinjuku-ku (JP); Etsuo Takasaki, Shinjuku-ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/086,638

(22) Filed: Mar. 4, 2002

(65) Prior Publication Data

US 2002/0174790 A1 Nov. 28, 2002

(30) Foreign Application Priority Data

Mar. 6, 2001 (JP) ......................................... 2001-061402

(51) Int. Cl.$^7$ .................................................. B41F 1/16
(52) U.S. Cl. ...................... 101/492; 101/211; 428/40.2; 428/195; 283/86
(58) Field of Search ................................. 101/492, 211; 400/210, 662, 241.4; 428/195, 40.2; 283/86

(56) References Cited

U.S. PATENT DOCUMENTS

| | | | | |
|---|---|---|---|---|
| 4,749,289 A | * | 6/1988 | Sugiura et al. | 400/210 |
| 4,938,617 A | * | 7/1990 | Mecke et al. | 400/241.4 |
| 5,801,857 A | * | 9/1998 | Heckenkamp et al. | 283/86 |
| 5,820,284 A | * | 10/1998 | Owada et al. | 400/662 |
| 6,369,919 B1 | * | 4/2002 | Drinkwater et al. | 283/86 |
| 6,468,379 B1 | * | 10/2002 | Naito et al. | 428/195 |
| 6,506,468 B1 | * | 1/2003 | Morii et al. | 428/40.2 |

* cited by examiner

*Primary Examiner*—Eugene H. Eickholt
(74) *Attorney, Agent, or Firm*—Parkhurst & Wendel, L.L.P.

(57) ABSTRACT

The present invention provides a method for image formation, that can yield thermally transferred images which are excellent in various fastness properties even under severe service conditions, and an intermediate transfer recording medium for use in the method for image formation. The method for image formation comprises the steps of: providing an intermediate transfer recording medium comprising a substrate film and a transfer portion provided separately on the substrate film; forming an image on the intermediate transfer recording medium in its transfer portion; transferring the transfer portion onto an object; and, thereafter, again transferring the intermediate transfer recording medium in its next transfer portion once or more onto the object with the image formed thereon. In this case, in the intermediate transfer recording medium, a hologram image is set every at least second image plane, and an image can be formed on the transfer portion having the hologram image. This can offer an advantage that the transfer portion, with a thermally transferable image formed thereon, can be transferred onto an object followed by the superimposition of a transfer portion, to be served as the outermost surface in the final form onto the transferred portion once or more to provide a strong film for protecting the thermally transferred image. Thus, the problems of the prior art could have been solved.

1 Claim, 2 Drawing Sheets

METHOD FOR IMAGE FORMATION AND INTERMEDIATE TRANSFER RECORDING MEDIUM

TECHNICAL FIELD

The present invention relates to a method for image formation which can yield a thermally transferred image possessing excellent various fastness properties even under severe service conditions, and an intermediate transfer recording medium for use in the method for image formation.

BACKGROUND ART

Thermal transfer has become extensively used as a simple printing method. The thermal transfer is a method which comprises the steps of: putting a thermal transfer sheet, comprising a colorant layer provided on one side of a substrate sheet, on top of a thermal transfer image-receiving sheet optionally provided with an image-receptive layer; an image-wise heating the backside of the thermal transfer sheet by heating means such as a thermal head to selectively transfer the colorant contained in the colorant layer to form an image on the thermal transfer image-receiving sheet.

Thermal transfer methods are classified into thermal ink transfer (hot melt-type thermal transfer) and sublimation dye thermal transfer (sublimation-type thermal transfer). The thermal ink transfer is a method for image formation wherein a thermal transfer sheet comprising a substrate sheet, such as a PET film, bearing thereon a hot-melt ink layer, formed of a dispersion of a colorant, such as a pigment, in a binder, such as a hot-melt wax or resin, is provided and energy according to image information is applied to heating means such as a thermal head to transfer the colorant together with the binder onto a thermal transfer image-receiving sheet such as paper or plastic sheets. Images produced by the thermal ink transfer have high density and possesses high sharpness and are suitable for recording binary images of characters or the like.

On the other hand, the sublimation dye thermal transfer is a method for image formation which comprises the steps of: providing a thermal transfer sheet comprising a substrate sheet, such as a PET film, bearing thereon a dye layer formed of a dye, which is mainly thermally transferred by sublimation, dissolved or dispersed in a resin binder; and applying energy according to image information to heating means such as a thermal head to transfer only the dye onto a thermal transfer image-receiving sheet comprising a substrate sheet, such as paper or a plastic, optionally provided with a dye-receptive layer. The sublimation dye thermal transfer can regulate the amount of the dye transferred according to the quantity of energy applied and thus can form gradation images of which the image density has been regulated dot by dot of the thermal head. Further, since the colorant used is a dye, the formed image is transparent, and the reproduction of intermediate colors produced by superimposing different color dyes on top of each other or one another is excellent. Accordingly, high-quality photograph-like full color images can be formed with excellent reproduction of intermediate colors by transferring different color dyes, such as yellow, magenta, cyan, and black, onto a thermal transfer image-receiving sheet, so as to superimpose the color dyes on top of each other or one another, from a thermal transfer sheet of the different colors.

Thermal transfer image-receiving sheets on which images will be formed by these thermal transfer methods have various practical applications. Representative examples of applications include proof sheets, and recording sheets for output images, output plans or designs drawn by CAD/CAM or the like, or images output from a variety of medical analyzers or measuring instruments such as CT scanners and endoscopic cameras. They can also be used as the alternative of instant photographs, and as paper for producing identity certifications, ID cards, credit cards, and other cards on which facial photographs or the like are printed, or for producing synthetic or memorial photographs which are taken at amusement facilities such as recreation parks, game centers, museums, aquariums and the like. The diversification of applications has led to an increasing demand for the thermal transfer of an image on any desired object. A method has been proposed, as one method for meeting this demand, wherein a colorant such as a dye or a pigment is transferred, from a thermal transfer sheet comprising a dye layer or a hot-melt ink layer, onto a receptive layer in an intermediate transfer recording medium comprising the receptive layer separably provided on a substrate to form an image on the receptive layer and, thereafter, the intermediate transfer recording medium is heated to transfer the receptive layer, with the image formed thereon, onto an object (Japanese Patent Laid-Open No. 238791/1987 or the like).

Since the use of the intermediate transfer recording medium permits the receptive layer to be transferred onto an object, this method is preferably used, for example, for objects, onto which a colorant is less likely to be transferred making it impossible to form high-quality images directly on them, and objects which are likely to be fused to the colorant layer at the time of thermal transfer. Further, a method may also be used wherein necessary matters such as signatures or the like are previously written or printed on an object and, thereafter, a transfer portion with an image of characters, a photograph or the like formed thereon is transferred from the intermediate transfer recording medium to prepare a print. Therefore, the intermediate transfer recording medium is preferably used in the preparation of passports or other identity certifications, credit cards/ID cards, or other prints.

Securities, that is, high reliability/safety, which means a high level of difficulty of forgery or alteration, are required of the above-described prints such as passports or credit cards. To make it difficult to perform forgery, alteration or the like by copying, various devices have hitherto been made.

The present applicant has already filed applications regarding an intermediate transfer recording medium having in its transfer portion a hologram pattern, micro-characters, etc., and a print produced by transferring the transfer portion onto an object, for preventing the forgery and alteration of passports, credit cards, or other prints (Japanese Patent Laid-Open Nos. 254844/1999 and 15939/2000). According to these techniques, the transfer of the hologram pattern or micro-characters, provided in the transfer portion, together with the image onto an object makes it difficult to forge and alter images, such as characters or a facial photograph, formed in the print and thus can realize high reliability and safety.

DISCLOSURE OF THE INVENTION

The formation of an image on an object using the conventional intermediate transfer recording medium, however, poses a problem that the image face in the transfer portion of the intermediate transfer recording medium comes into contact with the object and thus, although a film is formed on the outermost surface of the image on the object, the image, when exposed to service conditions which are severe in terms of various fastness properties, particularly chemical resistance, lightfastness and weathering resistance, is damaged.

Accordingly, it is an object of the present invention to solve the above problem of the prior art and to provide a method for image formation, which can yield a thermally transferred image having excellent various fastness properties even under severe service conditions, and an intermediate transfer recording medium for use in the method for image formation.

The above object of the present invention can be attained by a method for image formation, comprising the steps of: providing an intermediate transfer recording medium comprising at least a substrate film and a transfer portion provided separably on the substrate film; forming an image on the intermediate transfer recording medium in its transfer portion; transferring the transfer portion onto an object; and, thereafter, again transferring the intermediate transfer recording medium in its next transfer portion once or more onto the object with the image formed thereon.

In the intermediate transfer recording medium, preferably, a hologram image is set every at least second image plane and an image is formed on the transfer portion having the hologram image.

Another method for image formation according to the present invention comprises the steps of: providing an intermediate transfer recording medium with a hologram, wherein a transfer portion is provided which has at least two different hologram images alternately provided in the image plane portions as counted on the assumption that one image is set in one image plane; forming an image on the transfer portion in its region having one type of hologram image; transferring the transfer portion onto an object; and, thereafter, again transferring the intermediate transfer recording medium, with a hologram, in its next transfer portion once or more onto the object with the image formed thereon.

According to the present invention, there is provided an intermediate transfer recording medium comprising: at least a substrate film; and a transfer portion provided separably on the substrate film, wherein a hologram image is set every at least second image plane in the transfer portion of the intermediate transfer recording medium.

Another intermediate transfer recording medium according to the present invention comprises: at least a substrate film; and a transfer portion provided separably on the substrate film, wherein at least two different hologram images are provided alternately in the transfer portion as counted on the assumption that one image is set in one image plane.

In the present invention, an intermediate transfer recording medium comprising at least a substrate film and a transfer portion provided separably on the substrate film is provided, and an image is formed on the intermediate transfer recording medium in its transfer portion. The transfer portion is transferred onto an object, and, thereafter, the intermediate transfer recording medium in its next transfer portion is again transferred once or more onto the object with the image formed thereon. In this case, preferably, a hologram image is set every at least second image plane and an image is formed on the transfer portion having the hologram image.

In again transferring the intermediate transfer recording medium in its next transfer portion once or more on the object with the thermally transferred image formed thereon, preferably, the intermediate transfer recording medium in its next transfer portion is specifically transferred approximately once to three times. When the number of times of transfer is excessively large, unfavorable phenomena occur including that the level of irregularities on the surface of the print is large, the adhesion of the transfer portion to the object is lowered, and the thermally transferred image is blurred due to a lowering in transparency of the transferred portion located on the thermally transferred image.

In another method for image formation according to the present invention, an intermediate transfer recording medium with a hologram, wherein a transfer portion is provided which has at least two different hologram images alternately provided in the image plane portions as counted on the assumption that one image is set in one image plane, is provided, and an image is formed on the transfer portion in its region having one type of hologram image. The transfer portion is transferred onto an object, and, thereafter, the intermediate transfer recording medium with a hologram, in its next transfer portion is again transferred once or more onto the object with the image formed thereon.

In again transferring the intermediate transfer recording medium with a hologram, in its next transfer portion once or more onto the object with the thermally transferred image formed thereon, preferably, the intermediate transfer recording medium with a hologram, in its next transfer portion is specifically transferred approximately once to three times. The reason for this is as described above.

Thus, the transferred portion with the thermally transferred image formed thereon is provided on the object, and the transferred portion as the outermost surface in the final form of the print is superimposed once or more on the transferred portion with the thermally transferred image formed thereon. By virtue of this, a strong film for protecting the thermally transferred image can be provided, and, even when the print is exposed to severe service conditions, the thermally transferred image has excellent various fastness properties.

BEST MODE FOR CARRYING OUT THE INVENTION

Figure 1:
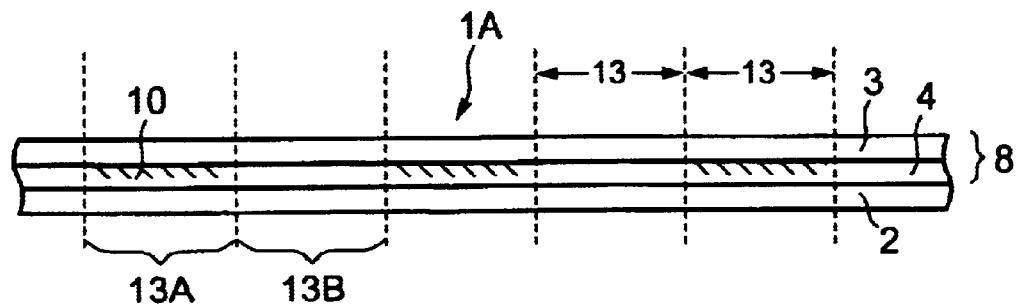
FIG. 1 is a cross-sectional view showing one embodiment of the intermediate transfer recording medium according to the present invention.

FIG. 1 is a cross-sectional view showing one embodiment of the intermediate transfer recording medium according to the present invention. An intermediate transfer recording medium 1A comprises a substrate film 2 and a transfer portion 8 separably provided on the substrate film 2. A hologram image 10 is provided in the transfer portion 8 every second image plane. The transfer portion 8 comprises a hologram layer 4 and a receptive layer 3. The hologram image 10 is formed in the hologram layer 4 every second image plane 13. After the image plane portion 13A with a thermally transferred image formed thereon (in which a thermally transferred image is located on the receptive layer on the hologram image) is transferred onto an object, the image plane portion free from the hologram image 10, that is, a image plane portion 13B, is put on top of the hologram image 10 and is transferred onto the object so as to constitute the outermost surface in the final form. Thus, the transfer portion 8 in its image plane portion 13B free from the hologram image 10, when transferred onto the object, functions to protect the thermally transferred image in the print.

Figure 2:
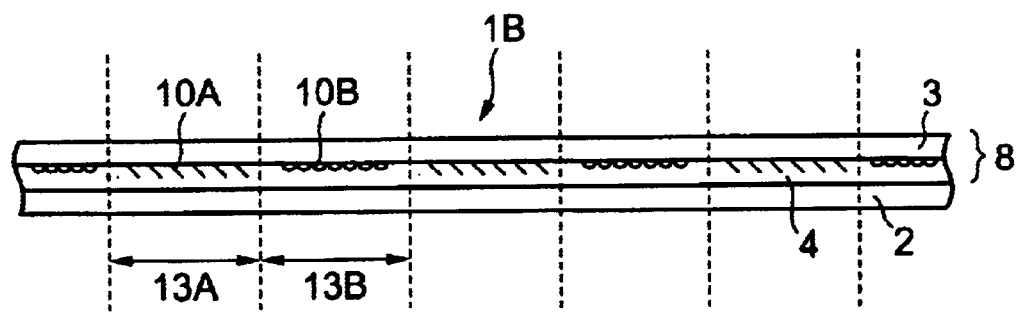
FIG. 2 is a plan view showing another embodiment of the intermediate transfer recording medium according to the present invention.

FIG. 2 is a cross-sectional view showing another embodiment of the intermediate transfer recording medium. An intermediate transfer recording medium 1B comprises a substrate film 2 and a transfer portion 8 separably provided on the substrate film 2. Different hologram images, i.e., a hologram image 10A and a hologram image 10B, are alternately and repeatedly formed in a face serial manner in a hologram layer 4 in the direction of flow of the intermediate transfer recording medium 1B as counted on the assumption that one image is set in one image plane. In the transfer portion 8, a hologram layer 4 and a receptive layer 3, on which an image is to be formed, are provided in that order from the substrate film 2 side. For example, when an image has been thermally transferred on the receptive layer 3 in its portion provided on the hologram image 10A, after the transfer of the image plane portion 13A with the hologram image 10A onto an object, the image plane portion 13B with the hologram image 10B free from the thermally transferred image can be transferred so as to be superimposed on the hologram image 10A.

Figure 3:
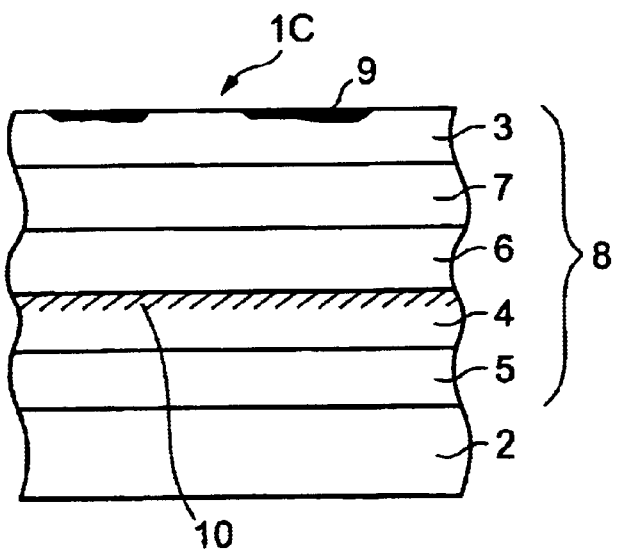
FIG. 3 is a partially enlarged cross-sectional view showing a further embodiment of the intermediate transfer recording medium according to the present invention.

FIG. 3 is a partially enlarged cross-sectional view showing a further embodiment of the intermediate transfer recording medium according to the present invention. An intermediate transfer recording medium 1C comprises: a substrate film 2; and, stacked on the substrate film 2 in the following order, a peel layer 5, a hologram layer 4, a transparent vapor deposited layer 6, an anchor layer 7, and a receptive layer 3. A hologram image 10 (pattern) is provided in the hologram layer 4. Micro-characters and a color figure pattern may also be formed in a transfer portion 8 comprising the peel layer 5, the hologram layer 4, the transparent vapor deposited layer 6, the anchor layer 7, and the receptive layer 3. In this intermediate transfer recording medium 1C, the transfer portion 8 after the formation of a thermally transferred image 9 is transferred onto an object, and, another transfer portion (not shown) adjacent to the portion, in which the image has been thermally transferred, is transferred onto the thermally transferred image 9 to prepare a print.

In the transfer portion 8 shown in FIG. 3, the layers other than the receptive layer 3 and the hologram layer 4, for example, the peel layer 5, the transparent vapor deposited layer 6, and the anchor layer 7, are not always indispensable and may be properly selected and provided, for example, according to the material of the object, the applications of the print, and the form of use, that is, are not particularly limited. Therefore, instead of or in addition to these layers, a layer having a specific function such as an ultraviolet absorbing layer may be properly selected and provided. The transparent vapor deposited layer 6 and the anchor layer 7 are in many cases provided together with the hologram layer 4.

Elements constituting the intermediate transfer recording medium will be described.

Hologram Image

The size and shape of the hologram image (pattern) 10 may vary depending upon the form of prints required and thus are not particularly limited. The hologram image is formed by a conventional method, for example, by a method wherein an original plate provided with a concave-convex pattern of interference fringes of a hologram is provided and fine concaves and convexes are formed by embossing or the like.

The hologram layer 4 is generally a resin layer, and this layer per se may have a single-layer structure or a multilayer structure. In the present invention, the hologram layer, when transferred onto the object, has the function of protecting the thermally transferred image to impart various fastness properties to the image.

The hologram layer may be formed of a planar hologram or a volume hologram. In the case of the planar hologram, among others, a relief hologram is preferred from the viewpoints of mass productivity and cost. Other holograms usable herein include: holograms reproducible by laser, such as Fresnel holograms, Fraunhofer holograms, lensless Fourier transformation holograms, and image holograms; holograms reproducible by white light, such as rainbow holograms; and holograms utilizing these principles, for example, color holograms, computer holograms, hologram displays, Multiflex holograms, holographic stereograms, and holographic diffraction gratings.

Photosensitive materials for the hologram layer for recording interfere fringes include silver salts, gelatin bichromate, thermoplastics, diazo photosensitive material photoresists, ferroelectrics, photochromics materials, and chalcogen glasses. Materials for the hologram layers usable herein include: thermoplastic resins, such as polyvinyl chloride, acrylic resins (for example, polymethyl methacrylate), polystyrene, and polycarbonates; cured products of thermosetting resins, such as unsaturated polyesters, melamine, epoxy, polyester (meth)acrylate, urethane (meth)acrylate, epoxy (meth)acrylate, polyether (meth)acrylate, polyol (meth)acrylate, melamine (meth)acrylate, and triazine acrylate; cured products of ultraviolet-curable resins, such as compositions comprising a sensitizer added to a proper mixture of an unsaturated ethylene monomer with an unsaturated ethylene oligomer; mixtures of the above thermoplastic resins with the above thermosetting resins; and thermoformable materials having a radically polymerizable unsaturated group. In particular, thermosetting resins and ultraviolet-curable resins are preferred as the resin for the hologram layer from the viewpoint of excellent fastness properties, such as excellent chemical resistance, lightfastness, and weathering resistance.

Substrate Film

The substrate film 2 is not particularly limited, and the same substrate film as used in the conventional intermediate transfer recording medium as such may be used as the substrate film 2. Specific preferred examples of the substrate film 2 include: thin paper, such as glassine paper, capacitor paper, or paraffin-waxed paper; and stretched or unstretched films of plastics, for example, highly heat resistant polyesters, such as polyethylene terephthalate, polyethylene naphthalate, polybutylene terephthalate, polyphenylene sulfide, polyether ketone, or polyether sulfone, and other plastics, such as polypropylene, polycarbonate, cellulose acetate, polyethylene derivative, polyvinyl chloride, polyvinylidene chloride, polystyrene, polyamide, polyimide, polymethylpentene, or ionomer. Further, composite films comprising a laminate of two or more materials selected from the above materials may also be used. The thickness of the substrate film 2 may be properly selected according to the material so as to provide proper strength, heat resistance and other properties. In general, however, the thickness of the substrate film 2 is preferably about 1 to 100 μm.

If necessary, a backside layer may be provided by a conventional method on the substrate film in its side remote from the transfer portion. The backside layer may be provided for preventing the substrate film from being fused to a heating device, such as a thermal head, at the time of the transfer of the transfer portion onto the object using the intermediate transfer recording medium and for improving the slidability and may be formed of the same resin as used in the prior art.

Receptive Layer

The receptive layer 5 is provided as a part of the transfer portion constituting the intermediate transfer recording medium so as to locate on the outermost surface remote from the substrate film. An image is formed by thermal transfer on the receptive layer from a thermal transfer sheet having a colorant layer. The intermediate transfer recording medium in its transfer portion with the image formed thereon is transferred onto an object, and, thus, a print is formed.

For this reason, a conventional resin material, which is receptive to a thermally transferable colorant such as a sublimable dye or a hot-melt ink, may be used as the material for the receptive layer. Examples of materials usable herein include: polyolefin resins such as polypropylene; halogenated resins such as polyvinyl chloride or polyvinylidene chloride; vinyl resins such as polyvinyl acetate, vinyl chloride-vinyl acetate copolymer, ethylene-vinyl acetate copolymer, or polyacrylic ester; polyester resins such as polyethylene terephthalate or polybutylene terephthalate; polystyrene resin; polyamide resin; resins of copolymers of olefins, such as ethylene or propylene, with other vinyl polymers; ionomers; cellulosic resins such as cellulose diastase; and polycarbonates. Vinyl chloride resins, acrylstyrene resins, or polyester resins are particularly preferred.

When the receptive layer is transferred through an adhesive layer onto an object, the receptive layer per se is not always required to be adhesive. On the other hand, when the receptive layer is transferred onto the object without through the adhesive layer, the formation of the receptive layer using a resin material having adhesive properties, such as vinyl chloride-vinyl acetate copolymer, is preferred.

The receptive layer may be formed by dissolving or dispersing a single or plurality of materials, selected from the above materials, optionally mixed with various additives or the like, in a suitable solvent such as water or an organic solvent to prepare a coating liquid for a receptive layer, coating the coating liquid by means such as gravure printing, image plane printing, or reverse coating using a gravure plate, and drying the coating. The thickness of the receptive layer is about 1 to 10 μm on a dry basis.

Peel Layer

The peel layer 5 is generally formed of, for example, a mixture of a resin having an acryl skeleton, a vinyl chloride-vinyl acetate copolymer, or cellulose acetate with a heat-curable acrylic resin, a melamine resin, a nitrocellulose resin, and polyethylene wax. The peel layer composed mainly of the resin having an acryl skeleton is particularly preferred. Further, a polyester resin and the like are preferably used for regulating the adhesion between the peel layer and the substrate film.

The peel layer may be formed, for example, by dissolving or dispersing a resin having an acryl skeleton and a polyester resin in a suitable solvent to prepare a coating liquid for a peel layer, coating the coating liquid onto a substrate film by means such as gravure printing, image plane printing, or reverse printing using a gravure plate, and drying the coating. The thickness of the peel layer is generally 0.1 to 10 μm on a dry basis.

Further, even in the case of a transfer portion not provided with a peel layer, suitable adhesion between the hologram layer and the substrate film can be imparted by rendering the hologram layer separable. Furthermore, the same function as in the peel layer can be imparted to the substrate film by imparting separability to the substrate film per se.

Instead of the peel layer, a release layer (not shown) may be provided on the substrate film. The release layer is generally formed of a binder resin and a releasable material. Binder resins include: thermoplastic resins, for example, acrylic resins such as polymethyl methacrylate, polyethyl methacrylate, and polybutyl acrylate, vinyl resins such as polyvinyl acetate, vinyl chloride-vinyl acetate copolymer, polyvinyl alcohol, and polyvinyl butyral, cellulose derivatives such as ethylcellulose, nitrocellulose, and cellulose acetate; and thermosetting resins, for example, unsaturated polyester resins, polyester resins, polyurethane resins, and amino-alkyd resins. Releasable materials usable herein include waxes, silicone waxes, silicone resins, melamine resins, fluororesins, fine powders of talc or silica, and lubricating agents such as surfactants and metallic soaps.

The release layer may be formed by dissolving or dispersing the above resin in a suitable solvent to prepare a coating liquid for a release layer, coating the coating liquid onto a substrate film by means such as gravure printing, image plane printing, or reverse coating using a gravure plate, and drying the coating. The thickness of the release layer is generally 0.1 to 10 μm on a dry basis.

Transparent Vapor Deposited Layer

The transparent vapor deposited layer 6 is generally provided on the receptive layer side so as to contact with the hologram layer. This transparent vapor deposited layer has a refractive index different from other layers and thus functions to allow the hologram pattern in the print to be seen as if the pattern is in a floated state. The transparent vapor deposited layer may be formed of any conventional material without particular limitation, for example, a metal oxide or metal sulfide such as $ZnS$, $TiO_2$, $SiO_2$, or $Cr_2O_3$. The transparent vapor deposited layer may be formed by a conventional method such as vacuum deposition or sputtering.

Anchor Layer

For example, in FIG. 3, the anchor layer 7 is provided so as to adhere the hologram layer 4 having on its surface the transparent vapor deposited layer 6 to the receptive layer 3. The anchor layer may be formed of a conventional material without particular limitation. The formation method may also be the same as used in the prior art.

Ultraviolet Absorbing Layer

If necessary, an ultraviolet absorbing layer may be provided as a part of the transfer portion at a suitable position between the receptive layer and the substrate film. This ultraviolet absorbing layer covers the transferred receptive layer to prevent the image in the print from being deteriorated by ultraviolet light contained in natural light. The ultraviolet absorbing layer may be formed of a conventional material without any particular limitation. The formation method may also be the same as used in the prior art.

Object

Next, an object 11 will be described. The intermediate transfer recording medium in its transfer portion with a thermally transferred image formed thereon is transferred onto the object, and, again, the intermediate transfer recording medium in its next transfer portion is further transferred once or more onto the image on the object to prepare a print provided with a thermally transferred image possessing excellent various fastness properties. The object to which the intermediate transfer recording medium according to the present invention is applied is not particularly limited, and examples thereof include natural fiber paper, coated paper, tracing paper, plastic films which are not deformed upon exposure to heat at the time of transfer, glasses, metals, ceramics, wood, and cloths.

Regarding the form and applications of the object, there is no limitation on the type, and examples thereof include: gold notes, such as stock certificates, securities, deeds, passbooks, railway tickets, streetcar tickets, stamps, postage stamps, appreciation tickets, admission tickets, and other tickets; cards, such as bank cards, credit cards, prepaid cards, membership cards, greeting cards, postcards, business cards, driver's licenses, IC cards, and optical cards; cases, such as cartons and containers; bags; forms control; envelops; tags; OHP sheets; slide films; bookmarks; calendars; posters; pamphlets; menus; passports; POP goods; coasters; displays; name plates; keyboards; cosmetics; accessories such as wristwatches and lighters; stationeries such as report pads; building materials; panels; emblems; keys; cloths; clothes; footwears; equipment or devices such as radios, televisions, electronic calculators, and OA equipment; various sample or pattern books; albums; and outputs of computer graphics and outputs of medical images.

Method For Image Formation

Next, the method for image formation according to the present invention, wherein an image is thermally transferred onto any object using the above intermediate transfer recording medium, will be described.

At the outset, the above intermediate transfer recording medium and a thermal transfer sheet comprising a colorant layer provided on a substrate are provided. The intermediate transfer recording medium is put on top of the thermal transfer sheet so that the transfer portion in the intermediate transfer recording medium comes into contact with the colorant layer in the thermal transfer sheet. The assembly is pressed between a heating device, such as a thermal head, and a platen roll. A heating portion in the heating device is selectively heated in response to image information to transfer the colorant of the colorant layer in the thermal transfer sheet onto the receptive layer in the intermediate transfer recording medium, thereby recording an image.

The thermal transfer sheet may be any conventional one. The colorant layer provided in the thermal transfer sheet is formed of a hot-melt ink or an ink containing a sublimable dye. The colorant layer is formed of a hot-melt ink or a sublimable dye ink which is properly selected depending upon the contemplated print. The colorant layer formed of a sublimable dye used in the formation of a print with good gradation may be formed by properly providing conventional sublimable dyes such as yellow, magenta, cyan, and black according to need in a face serial manner. On the other hand, in the case of monochromatic binary images of characters, numerals and the like, a thermal transfer sheet comprising a colorant layer formed of a hot-melt ink possessing excellent density and sharpness may be used alone. Alternatively, a thermal transfer sheet comprising a colorant layer formed of the sublimable dye and a hot-melt ink layer, which have been provided in a face serial manner, may be used.

Figure 4:
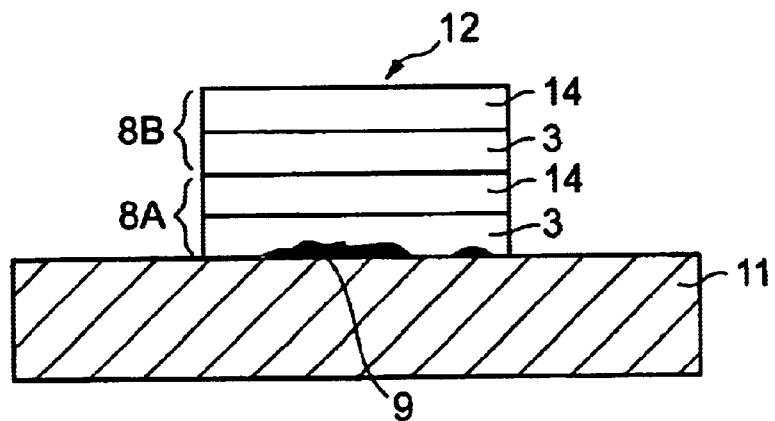
FIG. 4 is a cross-sectional view showing one embodiment of a final print produced by the present invention.

As shown in FIG. 4, an image 9 corresponding to one image plane as the print is thermally transferred onto the intermediate transfer recording medium 1 in its transfer portion 8A (receptive layer 3). Next, the transfer portion 8A with the thermally transferred image 9 formed thereon is pressed against the object 11 so that the image face of the transfer portion 8A comes into contact with the object 11, and the transfer portion 8A is transferred onto the object 11 by heating means such as a thermal head, a hot stamp, or a hot roll. In the means for heating the transfer portion 8A, for partial transfer, the use of a thermal head or a hot stamp is preferred, while, for transfer onto the whole surface of the object, a hot roll method is preferred.

Further, the intermediate transfer recording medium 1 in its transfer portion 8B adjacent to the transfer portion 8A, with the image 9 thermally transferred thereon, which has been transferred onto the object 11, or an intermediate transfer recording medium, which is different from the intermediate transfer recording medium 1 with the image 9 thermally transferred thereon, in its transfer portion 8B is transferred so as to cover the thermally transferred image 9 on the object 11. Thus, a final print 12 is prepared.

Figure 5:
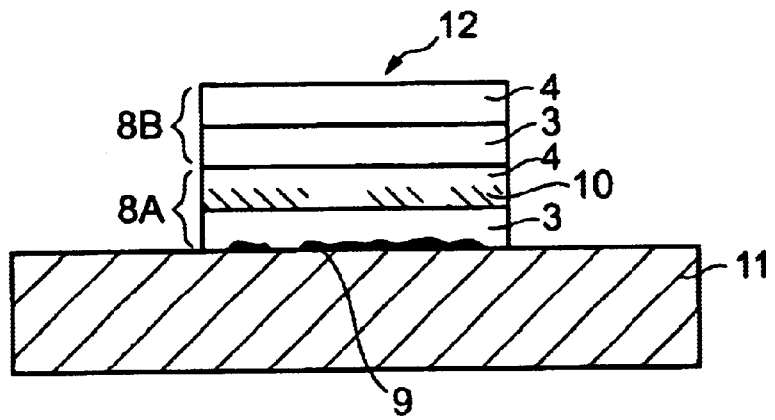
FIG. 5 is a cross-sectional view showing another embodiment of a final print produced by the present invention.

A print 12 shown in FIG. 4 has a construction comprising a first transferred portion 8A and a next transferred portion 8B. Both the transferred portions 8A and 8B have been transferred from an intermediate transfer recording medium comprising a receptive layer 3 provided on a film substrate through an intermediate layer 14 which is satisfactory in fastness properties such as chemical resistance, lightfastness, and weathering resistance. Examples of resins usable for forming the intermediate layer include: thermoplastic resins, such as polyester resin, polystyrene resin, acrylic resin, polyurethane resin, acrylated urethane resin, epoxy resin, phenoxy resin, products of modification of these resins with silicone, and mixtures of these resins; ionizing radiation-curable resins; and ultraviolet screening resins. If necessary, ultraviolet absorbers, organic fillers and/or inorganic fillers may also be properly added. FIG. 5 is a cross-sectional view showing one embodiment of the final print produced according to the present invention. The print shown in FIG. 5 has the same construction as the print shown in FIG. 4, except that a hologram layer 4 has been provided instead of the intermediate layer. In the intermediate transfer recording medium used, the transfer portion provided on the substrate film comprises a hologram layer 4 and a receptive layer 3 provided in that order on a substrate film. A hologram image 10 is provided in the hologram layer 4 every at least second image plane, and an image is thermally transferred onto the transfer portion 8A with the hologram image 10 formed thereon. Next, the transfer portion 8A with the image formed thereon is transferred onto an object 11. Thereafter, the transfer portion 8B comprising the hologram layer 4 and the receptive layer 3 is transferred from a next intermediate transfer recording medium onto the thermally transferred image 9 in the object 11. Preferably, the hologram layer 4 in the transfer portion 8B has no hologram image, the receptive layer 3 in the transfer portion 8B has no thermally transferred image, and the transfer portion 8B is transparent so that, when the thermally transferred image 9 and hologram image 10 underlying the transfer portion 8B in the print are observed, no trouble occurs.

Figure 6:
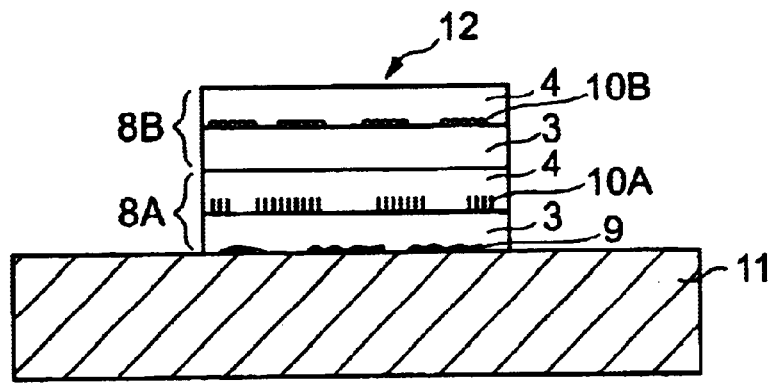
FIG. 6 is a cross-sectional view showing a further embodiment of a final print produced by the present invention.

FIG. 6 is a cross-sectional view showing one embodiment of the final print produced according to the present invention. The print shown in FIG. 6 has the same construction as the print shown in FIG. 4, except that a hologram layer 4 has been provided instead of the intermediate layer and the hologram image provided in the hologram layer 4 in the transfer portions 8A is different from the hologram image provided in the hologram layer 4 in the transfer portions 8B.

Therefore, the print shown in FIG. 6 is different from the print shown in FIG. 5.

The print shown in FIG. 6 is produced from an intermediate transfer recording medium with a hologram, wherein a transfer portion 8 provided on a substrate film comprises a hologram layer 4 and a receptive layer 3 provided in that order on the substrate film and, in the hologram layer, at least two different hologram images 10A and 10B are alternately provided as counted on the assumption that one image is provided in one image plane. An image 9 is thermally transferred onto the intermediate transfer recording medium in its transfer portion 8A which is the transfer portion 8 in its portion corresponding to one image plane with the hologram image 10A formed thereon. Next, the transfer portion 8A with the image formed thereon is transferred on the object 11, and, thereafter, the transfer portion 8B, comprising the hologram layer 4 and the receptive layer 3, which is the transfer portion 8 in its portion corresponding to one image plane with the hologram image 10B formed thereon, is transferred from the intermediate transfer recording medium onto the thermally transferred image 9 on the object 11. In this case, the hologram images 10A and 10B are provided at respective positions different from each other in the thicknesswise direction, that is, are provided in respective different layers, so as to cover the thermally transferred image 9. Therefore, in the print 12, the forgery and alteration can be fully prevented.

In the method for image formation according to the present invention, specified thermally transferred image and/or hologram image (in some cases, a combination of different hologram images) are stacked and transferred onto an object at its predetermined positions. In order to accurately perform registration of each thermal transfer at the time of the thermal transfer of the image and at the time of the thermal transfer of the hologram image, a method is preferably adopted wherein marks commonly used in the positional detection at the time of each transfer are provided and are detected with a detector and the detector is interlocked with a thermal transfer apparatus to perform registration for thermal transfer.

EXAMPLES

Example 1

A 12 μm-thick transparent polyethylene terephthalate film was first provided as a substrate film. The following coating liquid for a peel layer was coated on the surface of the substrate film, and the coating was dried to form a 1.5 μm-thick peel layer on the substrate film.

| (Coating liquid for peel layer) | |
| --- | --- |
| Acrylic resin | 40 parts |
| Polyester resin | 2 parts |
| Methyl ethyl ketone | 50 parts |
| Toluene | 50 parts |

An ultraviolet-curable acrylic resin ("Yupimer LZ 065 S," manufactured by Mitsubishi Chemical Corporation) was then coated onto the peel layer by gravure reverse coating. The coating was exposed to ultraviolet light and was dried to form a 2.0 μm-thick hologram layer. A hologram pattern was formed in the hologram layer by providing an original plate having a concave/convex pattern of interference fringes of a hologram and forming fine concaves and convexes by embossing.

Further, a 500 angstrom-thick titanium oxide layer was vacuum deposited as a transparent vapor deposited layer on the hologram layer with a hologram pattern formed thereon. The following coating liquid for a receptive layer was further coated onto the transparent vapor deposited layer, and the coating was dried to form a 2.0 μm-thick receptive layer.

| (Coating liquid for receptive layer) | |
| --- | --- |
| Vinyl chloride-vinyl acetate copolymer | 40 parts |
| Acryl silicone | 1.5 parts |
| Methyl ethyl ketone | 50 parts |
| Toluene | 50 parts |

Thus, the peel layer, the hologram layer, the transparent vapor deposited layer, and the receptive layer were provided in that order on the substrate film. The hologram image provided in the hologram layer was as shown in FIG. 1. That is, the hologram image was provided in the transfer portion of the intermediate transfer recording medium every other image plane.

Thus, an intermediate transfer recording medium of Example 1 was prepared.

An image was thermally transferred, on a receptive layer (image plane portion 13A) in the intermediate transfer recording medium, using a thermal transfer sheet comprising colorant layers of yellow, magenta, and cyan provided in a face serial manner.

Thereafter, a transfer portion 8A with the above image formed thereon was transferred onto a passport (an object) at its predetermined position.

Next, the intermediate transfer recording medium in its transfer portion 8B (corresponding to the image plane portion 13B in FIG. 1) was transferred once again on the thermally transferred image in the passport with the image formed thereon to produce a print as shown in FIG. 5.

Example 2

A peel layer, a hologram layer, a transparent vapor deposited layer, and a receptive layer were provided in that order on a substrate film in the same manner as in Example 1, except that the hologram image was formed as shown in FIG. 2, that is, two types of hologram images 10A and 10B were alternately and repeatedly provided in the transfer portions in the intermediate transfer recording medium as counted on the assumption that one image is set in one image plane.

Thus, an intermediate transfer recording medium of Example 2 was prepared.

An image was thermally transferred, on a receptive layer (image plane portion 13A) in the intermediate transfer recording medium, using a thermal transfer sheet comprising colorant layers of yellow, magenta, and cyan provided in a face serial manner.

Thereafter, a transfer portion 8A with the above image formed thereon was transferred onto a passport (an object) at its predetermined position.

Next, the intermediate transfer recording medium in its transfer portion 8B (corresponding to the image plane portion 13B in FIG. 2) was transferred once again on the thermally transferred image in the passport with the image formed thereon to produce a print as shown in FIG. 6.

Comparative Example 1

A peel layer, a hologram layer, a transparent vapor deposited layer, and a receptive layer were provided in that order on a substrate film in the same manner as in Example 1, except that the hologram image was continuously formed. Thus, an intermediate transfer recording medium of Comparative Example 1 was prepared.

An image was thermally transferred, on a receptive layer in the intermediate transfer recording medium, using a thermal transfer sheet comprising colorant layers of yellow, magenta, and cyan provided in a face serial manner. Thereafter, a transfer portion with the above image formed thereon was transferred onto a passport (an object) at its predetermined position to prepare a print.

Evaluation Results

For the prints prepared in Examples 1 and 2, the transferred portion with the thermally transferred image formed thereon is provided on the object, and the transferred portion as the outermost surface in the final form of the print is superimposed once on the transferred portion with the thermally transferred image formed thereon. By virtue of this, a strong film for protecting the thermally transferred image can be provided, and, even when the prints had been exposed to service conditions, which are severe in terms of various fastness properties such as chemical resistance, lightfastness, and weathering resistance, the thermally transferred image was not damaged. Further, the prints prepared in the examples of the present invention have a hologram image in its transferred portion and thus are excellent in the prevention of the forgery and alteration of the thermally transferred image of written contents or the like.

On the other hand, when the print prepared in Comparative Example 1 had been exposed to service conditions, which are severe in terms of various fastness properties such as chemical resistance, lightfastness, and weathering resistance, the thermally transferred image was damaged, and, as a result, a portion of the image became illegible.

As described above, in the method for image formation according to the present invention, an intermediate transfer recording medium comprising a substrate film and a transfer portion provided separably on the substrate film is provided, and an image is formed on the intermediate transfer recording medium in its transfer portion. The transfer portion is transferred onto an object, and, thereafter, the intermediate transfer recording medium in its next transfer portion is again transferred once or more onto the object with the image formed thereon. In this case, preferably, in the intermediate transfer recording medium, a hologram image is set every at least second image plane and an image is formed on the transfer portion having the hologram image.

Further, a method for image formation may also be adopted which comprises the steps of: providing an intermediate transfer recording medium with a hologram, wherein a transfer portion is provided which has at least two different hologram images alternately provided in the image plane portions as counted on the assumption that one image is set in one image plane; forming an image on the transfer portion in its region having one type of hologram image; transferring the transfer portion onto an object; and, thereafter, again transferring the intermediate transfer recording medium, with a hologram, in its next transfer portion once or more onto the object with the image formed thereon.

Thus, the transferred portion with the thermally transferred image formed thereon is provided on the object, and the transferred portion as the outermost surface in the final form of the print is superimposed once or more on the transferred portion with the thermally transferred image formed thereon. By virtue of this, a strong film for protecting the thermally transferred image can be provided, and, even when the print is exposed to severe service conditions, the thermally transferred image is excellent in various fastness properties.

Further, the provision of a transferred portion having a thermally transferred image and a hologram image in the print can impart better prevention of the forgery and alteration of the thermally transferred image to the print.

What is claimed is:

1. A method for image formation, comprising the steps of:

providing an intermediate transfer recording medium comprising a substrate film and at least a first transfer portion and a second transfer portion provided separably on the substrate film, the first transfer portion comprising a thermally transferable colorant receptive layer;

forming an image on the first transfer portion of the intermediate transfer recording medium;

first transferring the first transfer portion having the image onto an object; and, second transferring the second transfer portion of the intermediate transfer recording medium onto the first transfer portion formed on the object, thereby forming a laminate structure comprising the first transfer portion and the second transfer portion on the object.

* * * * *